March 5, 1957 H. W. KENNEY ET AL 2,783,818
SMOOTH TOP V-BELT AND METHOD OF MAKING SAME
Filed Nov. 6, 1952 3 Sheets-Sheet 1

D. L. WAUGH
H. W. KENNEY
R. B. CAPSTICK
INVENTOR.

BY
ATT'Y.

March 5, 1957  H. W. KENNEY ET AL  2,783,818
SMOOTH TOP V-BELT AND METHOD OF MAKING SAME
Filed Nov. 6, 1952  3 Sheets-Sheet 2

INVENTOR.
D. L. WAUGH
H. W. KENNEY
R. B. CAPSTICK
BY
ATT'Y.

United States Patent Office 2,783,818
Patented Mar. 5, 1957

2,783,818

SMOOTH TOP V-BELT AND METHOD OF MAKING SAME

Harry W. Kenney, Atlanta, Ga., and Dale L. Waugh and Robert B. Capstick, Dayton, Ohio, assignors to The Dayton Rubber Company, a corporation of Ohio Application November 6, 1952, Serial No. 319,066

4 Claims. (Cl. 154—4)

This invention relates to power transmission belts and particularly to belts capable of operating over V-groove pulleys while at the same time imparting a reverse rotation to one or more flat pulleys in combination therewith. The invention also includes the method and the apparatus to be used in the manufacture of such belts.

Belt drives involving a V-type power transmission belt in engagement with V-groove pulleys at its side driving surfaces and with oppositely rotating flat sheaves at its top or outer face are being applied with increasing frequency in the fractional horsepower transmission field where severe limitations on allowable space and cost are often encountered. In many of such applications there is the additional requirement of vibration-free operation.

On drives of this type, however, it has been found that the conventional V-type belt, when its outer face is in contact with a flat pulley, will have a tendency to vibrate. It has also been found that when such belts are held in place by the V-groove pulleys on their inner sides, their outer surface will not be free to conform to the driving surface of the flat pulley, so that contact will not be uniform throughout the width of the belt top. This uneven contact causes uneven wear on the back driving surface of the belt and will allow the belt to slip on the pulley thus reducing the transmission efficiency. It has been found further that this slippage and uneven contact leading to uneven wear have been the causes of the objectionable vibration.

It is an object of this invention to provide a belt capable of operating satisfactorily about a chain of V-grooved pulleys while maintaining uniform driving engagement with oppositely rotating flat pulleys on its outer face.

It is also an object of this invention to provide a V-type power transmission belt, the top or outer face of which is uniformly smooth and is in parallel planar relationship with the belt's axis of flexure so as to impart greater efficiency and longer life when such belt is used in a train of mechanism including an oppositely rotating flat pulley.

A further object of this invention is to provide a belt of the type mentioned which has an outer covering of straight or bias-cut fabric impregnated with vulcanizable material such as rubber, said cover being applied to only three faces of the belt leaving the smooth, uncovered outer face provided by this invention exposed to direct contact with the flat pulleys.

It is another object of this invention to provide a method for the manufacture of belts of the type herein disclosed.

It is still another object of this invention to provide an apparatus for smoothly finishing belts of the type herein described while said belts are rotating in a manner approaching operating conditions.

Figure 1:
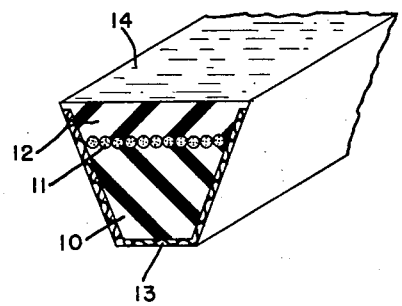
Figure 1 is a perspective view in vertical section of a belt embodying the principles of our invention before the outer surface has been finished in the manner of this invention.
Figure 2:
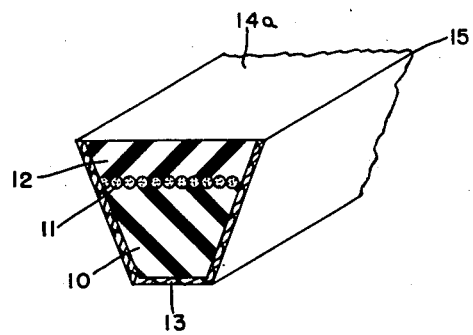
Figure 2 is a perspective view in vertical section of the belt at an intermediate stage of its manufacture according to this invention.
Figure 3:
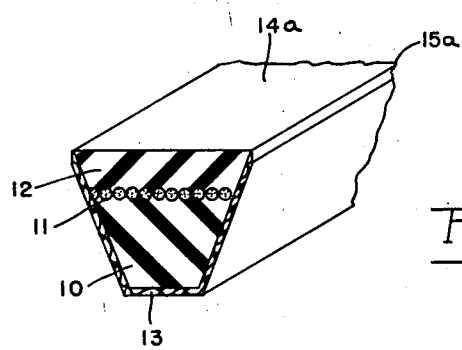
Figure 3 is a perspective view in vertical section of the belt of this invention as it is finally constructed.

Referring now to Figures 1, 2, and 3 showing the belt of this invention, it can be seen that a preferred embodiment thereof is a conventional truncated V-type belt comprising a compression section 10 of a synthetic rubber composition, a neutral axis section 11 of inextensible cords, and a tension section 12 of rubber or synthetic rubber composition. In this belt is will be observed that the outermost portion of the tension section 12 has no impregnated fabric or covers such as are commonly used in this type of belt, but consists solely of the synthetic rubber compound, preferably neoprene. The absence of any cover or wrapper over the outer face of the belt at once eliminates the possibility of the formation of surface irregularities thereon which are bound to occur wherever the belt covering material is spliced.

When the fabric cover 13 is applied in the commonly known manner, the outer surface 14 is left exposed, the cover being applied to only the inner and lateral faces of the belt. In the process of curing and molding the belts thus covered, the material forming the top part of the belt may overflow and extend above and outward of the upper edges of the cover as shown in Figure 1. In the belt of this invention, however, this normally objectionable overflow is not critical in view of the fact that the outer face of the belt will later be ground to a smooth and uniform surface as will be hereinafter disclosed. Similarly, the irregularities in the outer face of the belt normally encountered when the mold or curing press platen is covered with a wrapper, jacket, or liner, are not objectionable and will be eliminated during manufacture of the belts by the methods of this invention. Thus, greater tolerances are allowable in the early stages of production of this belt, even though it will finally have more uniformity and a more satisfactorily finished outer surface.

Once the belt has been wrapped and molded, it is stretched slightly to approximate the conditions under which it will finally be put into operation; and while it is in motion, its outer face 14 is subjected to the abrasive action of an abradant which is itself preferably in rotating motion about an axis parallel to that of the moving belts. The abradant's shape and mounting should, of course, be such that a uniform tangential contact between belt top and abrasive will be maintained throughout the final finishing process. The rotation of the abradant may be either the same as or opposed to that of the belts, the latter arrangement allowing a greater velocity differential between belts and abradant thereby hastening the grinding process. The effect of this grinding operation is to smooth the outer surface 14a of the belt as shown in Figure 2 to a plane substantially parallel with the belt's flexing axis so that when the belt is placed on a drive of the type herein discussed, said outer face will make an even contact with the flat pulley and will be free from irregularities which cause the objectionable vibrations.

As shown further in Figure 2, the grinding of the tension section may leave the outer face 14a lying in the plane of the upper edges 15 of the cover 13. Thereafter the edges of this extending portion may be cut in any appropriate means to produce the uniform edges 15a along the flat pulley driving surface as shown in Figure 3. The extending layer of material thus formed and bounded by the smoothly ground surface 14a and the uniform edges 15a provides a cushioning layer to reduce further the noise and vibration of the drive and the slippage of the belt about the flat pulley. Depending upon the particular design and desired belt thickness, it is sometimes desirable to grind the outer surface 14a of the belt to a plane lying below the upper edges 15 of the side cover. In this case the grinding tends to fray the edges of the cover, but once again, such fraying is not objectionable since the edges of the top face will be skived along a substantially vertical plane 15a.

It is not to be inferred, however, that the skiving of the upper edges of the belt is solely a device to obviate problems of production. This is but a convenient adjunct to the function of the finally skived edge which is an important feature of the belt of this invention. It is well known that as V-type belts operate in V-groove pulleys the former wear on their side driving faces and tend to wedge deeper into the pulley groove. Where the upper portion of the belt rides above the pulley grooves, the top of the converging sides does not contact the pulley and hence does not wear. It follows that as the belt wedges down into the pulley the unworn portion of the belt will be wider than the space allowed in the groove and a vertical distortion of the outer or top surface of the belt will take place resulting in its uneven contact with a flat pulley. By skiving the upper edges as previously described, that part of the belt that would normally restrict the wedging of the belt in the groove is removed so that no distortions occur in the top surface as the belt wears into the pulley groove.

Figures 4, 5, 6:
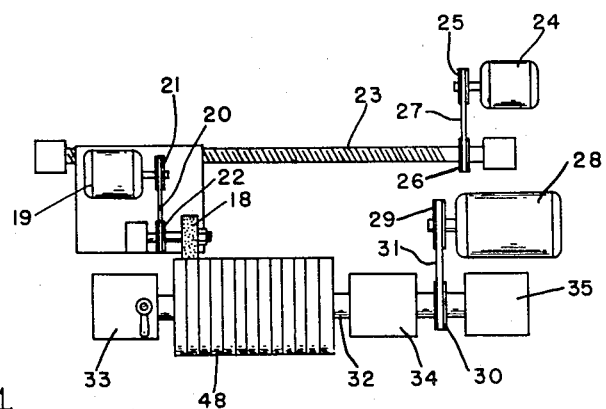
Figure 4 is a plan view of a machine embodying that part of our invention relating to the apparatus for manufacturing a belt of the type described.
Figure 5 is an expanded elevational view of the tapered cone and sleeve forming a part of the machine of Figure 4 in which the sleeve portion is shown in vertical section.
Figure 6 is an elevational view in vertical section of the cone and sleeve of Figure 5 showing the manner of separation of the sleeve from the cone.

Figures 4, 5, and 6 refer to that part of this invention embodying an apparatus for carrying out the above-described process for finishing the belts of the present invention. The belts 48 having been wrapped on three sides and cured are placed on the annular sleeve 16 which is made of an expansible material such as rubber, the outside circumference of said sleeve 16 being slightly less than the inside circumference of the belts 48 to facilitate the mounting of the latter upon the former. The inside circumference of the sleeve is uniformly reduced leaving an opening in the form of a truncated cone within the sleeve.

The drum 17 is rigidly constructed and is similarly tapered at the same angle as the cavity within the sleeve 16. The drum, however, is slightly larger than the sleeve in transverse dimensions so that when the elastic sleeve 16 is forced over the drum 17 as shown in Figure 5, the sleeve is expanded and exerts a force radially outward against the inner surface of the belts 48 causing the latter to rest in a state of longitudinal tension similar to that under which they will subsequently operate.

The belts, sleeve, and drum thus mounted are placed on a shaft 32 journaled in mounting blocks 33, 34, and 35 with bearings 36 and 37 engaging the shaft rotatably mounted in such a manner as to be energized as shown here by an electric motor 28, driving pulley 29, driven pulley 30, and transmission belt 31 in driving combination. The belts are then exposed to the abrasive action of the grinding wheel 18 which is rotatively energized in the illustration by electric motor 19, its driving pulley 21, power transmission belt 20, and driven pulley 22. This grinding wheel 18 and its rotative mechanism are mounted on a carriage provided with a rack to engage the rotating helical worm gear 23 which is driven by motor 24, belt 27, and pulleys 25 and 26. The helical gear 23 and the shaft 32 are arranged in parallel so that as the grinding wheel passes laterally over the outer surface of the rotating belts 48, a uniform tangential contact between belts and wheel is maintained.

Figure 7:
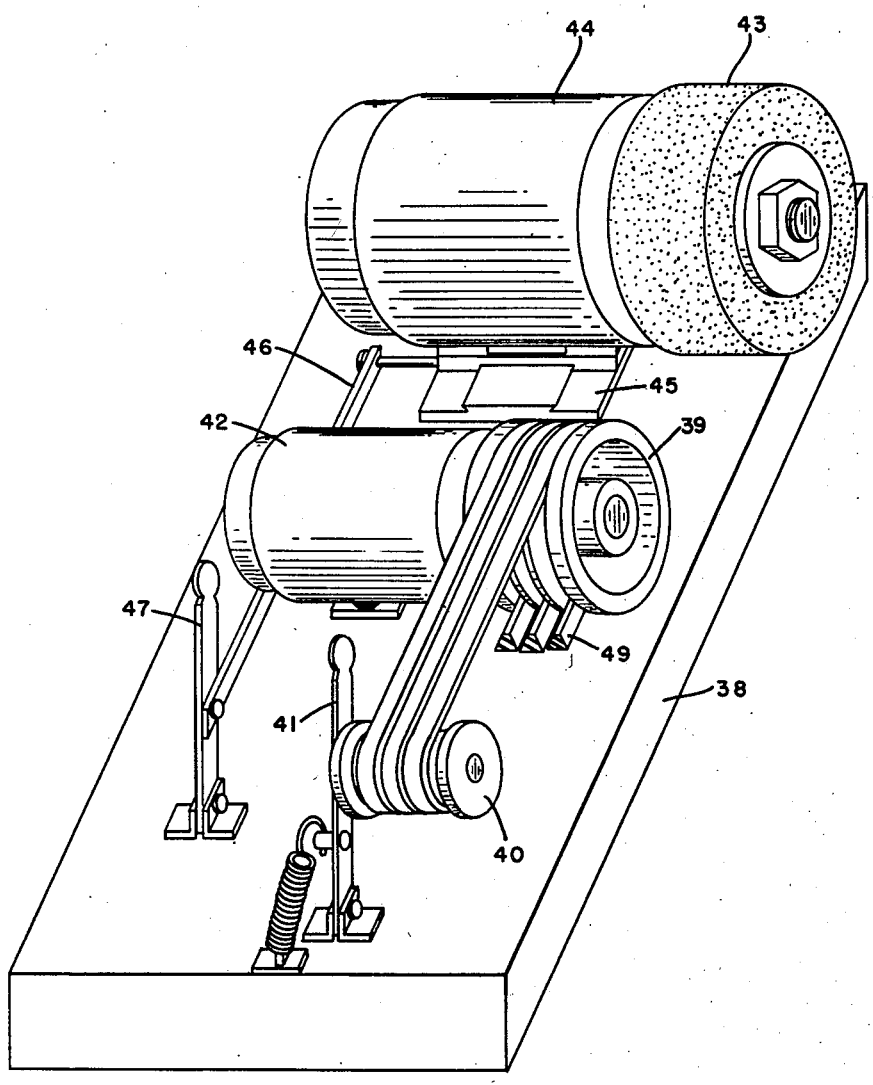
Figure 7 is a perspective view of an alternate type of machine for use in the manufacture of the belts of the present invention.

In Figure 7, an alternative apparatus for accomplishing the operation above described is shown mounted on the body portion 38. On the driving pulley 39 rotatively energized by electric motor 42 are mounted the belts 49. The driven pulley 40, about which the belts also pass, is rotatably mounted on lever arm 41 which is in turn pivotally mounted on the body portion 38 so as to be moveable in a plane perpendicular to the rotational axes of pulleys 39 and 40. The lever arm 41 accordingly regulates the center distance between the pulleys, and is pushed forward to reduce such center distance facilitating the mounting of the belts and then returned to its spring-loaded position to place the belts in the desired tension.

The abrasive wheel 43 is rotatably energized by appropriate means such as electric motor 44, and the combination of these is slidably mounted on the guiding base 45. The drag link 46, pivotally mounted to the motor and grinding wheel combination at one end and to the lever arm 47 at the other imparts a sliding motion to the grinding wheel in a direction perpendicular to the axis of rotation of the belts when the lever arm 47 is moved accordingly.

Movement of the lever arm 47 will bring the cylindrical abrasive 43 into uniform tangential contact with the outer face of the belts. In this apparatus, the sides of the pulleys 39 and 40 support the sides of the belts 49 so that the outer face of the belts is urged against the abrasive wheel by the same forces that will urge said face against an oppositely rotating flat pulley when the belts are used on a drive of the type herein considered. Thus, it is seen that this apparatus also provides for uniform contact between abrasive and belts while both are rotating and the belts are under operating conditions.

It is to be understood that the embodiments of the invention disclosed above are for descriptive purposes only and do not limit this invention or of the subjoined claims.

We claim:

1. A flexible rubber driving belt of truncated V cross section having an inner face and upwardly diverging sides, said face and sides being provided with a cover vulcanized thereto, and uncovered and smoothly ground outer face which is parallel to the axis of flexure of said belt, and skived surfaces along the upper edges of said upwardly diverging sides and the cover thereon and disposed at an angle to the respective planes thereof.

2. In a V-type power transmission belt defined by downwardly converging sides and inner and outer faces, comprising a compression section, a tension section, and a neutral axis section of inextensible cords, said sides and inner face provided with a cover and said outer face being left uncovered, said uncovered outer face having a smoothly ground surface, said surface parallel to the neutral axis of said belt and bounded on each edge by a plane angularly disposed to said sides.

3. A method for the manufacture of smooth top V-belts comprising forming a belt core having an inner compression section of synthetic rubber material, an intermediate neutral axis section of inextensible strength material and an outer tension section of synthetic rubber material, applying a wear-resistant cover to the inner and side driving surfaces of said core so that a portion of said synthetic rubber tension section extends above the upper edges of said cover, vulcanizing the belt thus formed, longitudinally tensing the belt, grinding the upper surface of the same while in its stretched position to form a smooth planar surface which is parallel to the flexural axis of the belt near the upper edges of said cover and skiving the upper edges of the belt and said cover at an angle to said side driving surfaces.

4. A method for the manufacture of V-belts having a uniformly smooth top surface parallel to the flexural axis thereof which comprises forming a V-belt having a wear-resistant cover about its inner and angularly disposed side driving surfaces and an exposed tension section of rubber-like material, longitudinally tensing the belt, abrading the top surface of said belt while in its tensed position and skiving the upper edges of said upwardly diverging sides and the cover thereon.

References Cited in the file of this patent

UNITED STATES PATENTS

| | | |
|---|---|---|
| 835,320 | Pomeroy | Nov. 6, 1906 |
| 1,157,844 | Carroll | Oct. 26, 1915 |
| 1,647,129 | Heim | Nov. 1, 1927 |
| 1,654,737 | Kistner | Jan. 3, 1928 |
| 1,661,505 | Rottler | Mar. 6, 1928 |
| 1,725,002 | Jenkins | Aug. 20, 1929 |
| 1,968,550 | Barnes | July 31, 1934 |
| 2,113,561 | Freedlander | Apr. 12, 1938 |
| 2,163,347 | Nassimbene | June 20, 1939 |
| 2,341,656 | Rockoff | Feb. 15, 1944 |
| 2,588,647 | Mitchell | Mar. 11, 1952 |
| 2,678,678 | Keuchenmeister | May 18, 1954 |